I. EVERY.
BAKING UTENSIL.
APPLICATION FILED OCT. 3, 1921.
1,427,796.
Patented Sept. 5, 1922.
Fig. 1.
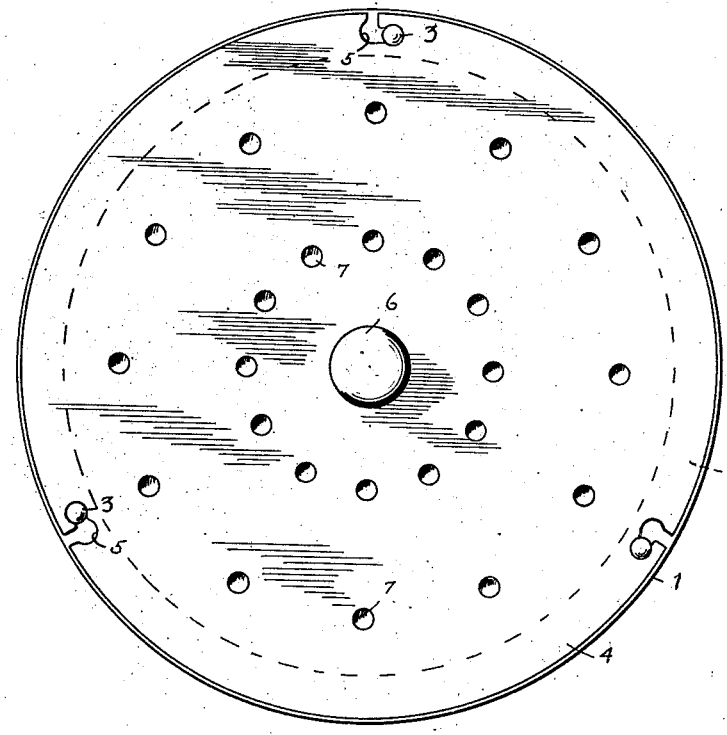
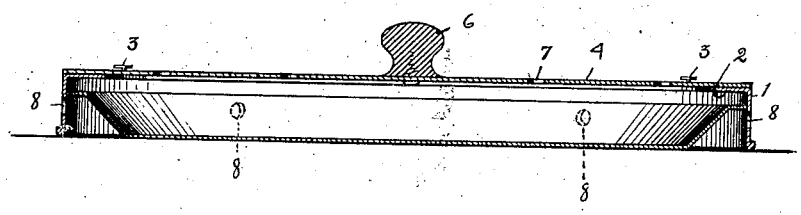
Fig. 2.
INVENTOR
Isabel Every
Tho Stevens
ATTY.

Patented Sept. 5, 1922.

1,427,796

UNITED STATES PATENT OFFICE.

ISABEL EVERY, OF HIBBING, MINNESOTA.

BAKING UTENSIL.

Application filed October 3, 1921. Serial No. 504,896.

*To all whom it may concern:*

Be it known that I, ISABEL EVERY, a citizen of the United States, residing at Hibbing, in the county of St. Louis and State of Minnesota, have invented certain new and useful Improvements in Baking Utensils, of which the following is a specification, reference being had therein to the accompanying drawing.

This invention relates to baking utensils and has special reference to a shield or protector for culinary vessels such as pie tins or the like.

The object of the invention is to produce a convenient separable shield or protector for pie tins in which various kinds of pies may be baked and protected with the least inconvenience possible.

Other objects and advantages will appear in the further description of the invention.

Referring to the accompanying drawing forming part of this application in which like reference characters indicate like parts:

Figure 1 is a top plan view of one of my improved shields and

Figure 2 is a central vertical sectional view on the line 2—2, Figure 1, as applied to a pie tin or plate.

The body portion of the shield comprises an angular ring consisting of the vertical band portion 1 and the horizontal flange 2. Upon the flange and extending upwardly therefrom are a plurality of spaced equidistant headed pegs 3, preferably three in number, and, removably carried upon the body portion and resting upon the flange 2 is the cover portion 4, it being provided adjacent its peripheral edge with right angularly shaped slots 5, they being spaced the same distance apart and of the same number as the pegs 3. The corners of these L-shaped slots are somewhat enlarged so as to permit of the heads of the pegs passing freely through same while the remainder of the slot is of a width less than the diameter of the head of the pegs so that when the cover is turned slightly it will become locked beneath the heads of the pegs and it become impossible of dislodgement from the body portion of the protector without being sufficiently turned to lift free of the pegs.

One end of each of these slots is open through the edge of the cover so as to permit of conveniently applying the cover by sliding one edge into position about the peg which it is readily understood assists in the almost instant registration of the other pegs, whereas if only elongated and slotted holes were used some difficulty would be experienced in quickly placing the cover onto the body portion for removing or applying same to a pie.

In this manner a closure or cover is provided for the shield which may or may not be used in conjunction therewith. However it is evident that even in applying or removing the body portion of the protector it may at times become convenient to apply the cover for the simple purpose of lifting the remainder of the shield from a pie providing the same were inconveniently hot.

A suitable wooden or other knob 6 may be provided in the center of the cover for conveniently handling same and both the cover and body portion are perforated as at 7 and 8 respectively for the purpose of permitting the escape of gases and steam.

Now the principal object in making this shield or protector in two separable parts is so that the edges of a one crust pie may be protected by the use only of the body portion of the protector, whereas when a two crust pie is being made the entire protector may be employed for the purpose of providing ample time for the pie to become thoroughly baked before the crust is burned or unduly baked, and in practice it is preferred to have the protector sufficiently large to completely surround the pie tin in which the pie is being baked with the protector resting upon the surface supporting the pie, though it is evident in some instances it may be desirable for the protector to rest upon the rim of the pie tin.

Having thus described my invention what I claim and desire to secure by Letters Patent, is:

1. A pie protector of the class described comprising a perforated angular ring having a horizontally disposed inwardly projecting flange upon the upper edge thereof, headed pegs spaced about the upper face of said flange and a removable perforated cover having L-shaped slots therein for registration with the headed pegs whereby the cover may be engaged with said ring for the purpose described.

2. A pie protector of the class described comprising a perforated angular ring having a horizontally disposed inwardly projecting flange upon the upper edge thereof, headed pegs spaced about the upper face of said flange and a removable perforated cover having L-shaped slots therein for registration with the headed pegs, said slots having one end thereof open through the peripheral edge of the cover so as to permit of the cover being applied edgeways to the pegs, and a knob in the center of the cover for handling same.

In testimony whereof I hereunto affix my signature in the presence of two witnesses.

ISABEL EVERY.

Witnesses:
S. J. SICOTTE,
JULIUS N. JOHNSON.